March 15, 1966  A. H. SMITH  3,241,002
CONTROL FOR ELECTROMAGNETIC COUPLING APPARATUS
Filed Nov. 5, 1962
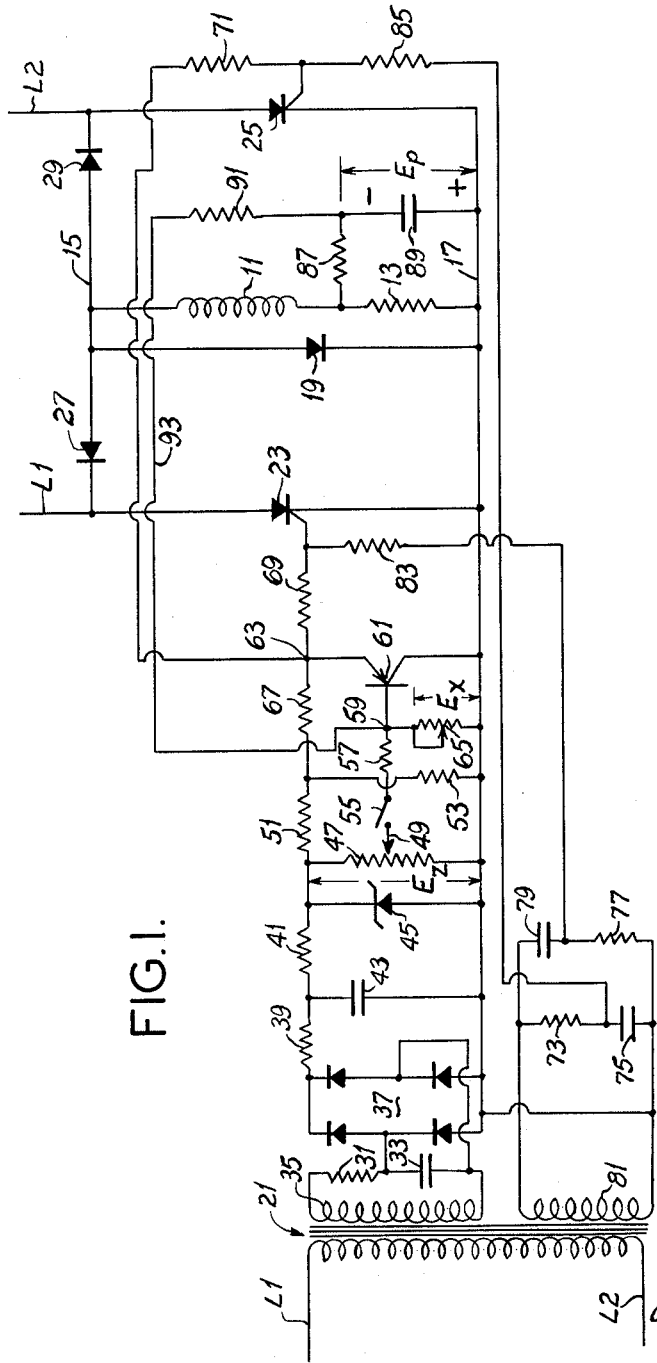
FIG.1.
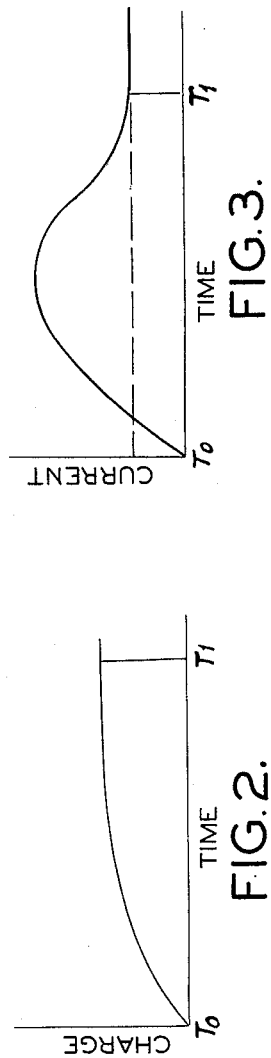
FIG.3.
FIG.2.
Aubrey H. Smith,
Inventor.
Koenig, Pope, Senniger and Powers,
Attorneys.

[Column 1]

3,241,002
CONTROL FOR ELECTROMAGNETIC COUPLING APPARATUS
Aubrey H. Smith, Kenosha, Wis., assignor to Eaton Manufacturing Company, Cleveland, Ohio, a corporation of Ohio
Filed Nov. 5, 1962, Ser. No. 235,244
14 Claims. (Cl. 317—148.5)

This invention relates to a control for electromagnetic coupling apparatus, and more particularly to a control for energizing a field coil associated with electromagnetic friction-type coupling apparatus.

In the electromagnetic coupling apparatus such as illustrated in U.S. Patent No. 2,973,850 granted to R. L. Jaeschke, in order to transfer torque from a driving or input member to a driven or output member for braking or driving purposes, a field coil is energized to draw the members into frictional engagement. Usually provision is made for biasing the members apart so that when the field coil is deenergized the members are forced out of frictional engagement. In the apparatus disclosed in the above-mentioned Jaeschke patent, for example, a plurality of spring devices are employed to provide this biasing action. To bring about braking or clutching action, the magnetic field produced by the field coil upon energization must be sufficient not only to overcome the inherent axial friction forces and inertia in the apparatus, as well as the forces biasing the driving and driven members apart, but also must be of a magnitude to apply sufficient holding force to bring about full engagement between the driving and driven members. The response time of the device, i.e., the time required for the members to fully frictionally engage, is accordingly proportional to the time required for the magnetic field produced by the field coil to build up to a value sufficient to overcome the forces tending to separate the members and apply the necessary holding force. The present invention is directed to a control circuit for energizing the field coil of an electromagnetic coupling device of the class described to cause the magnetic field produced by this coil to build up rapidly so as to reduce appreciably the response time of the device.

Among the several objects of this invention may be noted the provision of a control for energizing a field coil associated with electromagnetic coupling apparatus, such as a friction-type electromagnetic clutch or brake of the type illustrated in the above-mentioned Jaeschke patent; the provision of such a control which appreciably reduces the response time of the apparatus, i.e., the time required for clutch or brake action; the provision of a control circuit of the class described wherein the steady-state current through the field coil after initial energization is readily and accurately controlled; and the provision of such a control which is inexpensive, rugged, and reliable in operation. Other objects and features will be in part apparent and in part pointed out hereinafter.

Essentially, the control of this invention comprises a source of electrical power, an electronic transducer, for example, a silicon controlled rectifier or other electronic device, having a control electrode which is adapted to control the conductivity of the transducer and a first electrical circuit which interconnects the power source with this transducer and the field coil so that the average level of conductivity of the transducer establishes the degree of energization of the field coil. Also included are control means having an input and adapted to supply an output signal to the control electrode of the transducer to change the conductivity thereof from a first state of high average conductivity to a second state wherein the average conductivity of the transducer is reduced to a predetermined level. Means are provided to sense the current

[Column 2]

flow through the field coil and develop an electrical signal having a magnitude which is a time-delayed function of the level of this current flow. Finally, a second electrical circuit is provided to interconnect the sensing and delay means with the input of the control means whereby the conductivity of the transducer is changed from its first state of conductivity to the second state at a delayed interval after initial energization of the field coil, and the initial degree of energization of the field coil is thereupon accordingly reduced. In a specific embodiment of the invention disclosed herein, the current through the field coil during the period between initial energization thereof and the delayed interval thereafter exceeds the rated or steady-state capacity of the coil and as a result the time required for braking or clutching action after initial energization of the field is appreciably reduced.

The invention accordingly comprises the constructions and circuits hereinafter described, the scope of the invention being indicated in the following claims.

In the accompanying drawings, in which one of various possible embodiments of the invention is illustrated, FIG. 1 is a circuit diagram illustrating the electrical components of this embodiment and their interconnection;

FIG. 2 illustrates the charge build-up on a capacitor included in a sensing means of the FIG. 1 control; and FIG. 3 is a graph illustrating the current build-up through a field coil after initial energization thereof by a control of this invention.

Corresponding reference characters indicate corresponding parts throughout the drawings.

Referring now to the drawings, and more particularly to FIG. 1, the field coil to be energized is indicated by reference numeral 11. This coil, which corresponds for example to coil 35 in the Jaeschke patent above mentioned, is connected in series with a resistor 13 between two conductors 15 and 17. The parameters of this coil are preferably such that rated current flows therein when low voltage, for example, 12 v. D.C., is applied across its terminals. Connected in parallel with coil 11 and resistor 13 is a transient-suppressing diode 19. A pair of conductors L1, L2 are provided, connected to an A.C. power source such as a 115 v. A.C., 60 c.p.s. source. Conductors L1 and L2 supply power for energizing the field coil; they also are connected to the primary winding of a transformer 21 to provide power for a portion of the FIG. 1 circuit which constitutes a control means to be described hereinafter. A pair of silicon controlled rectifiers (SCR's) 23 and 25 are provided, connected respectively between line L1 and conductor 17, and line L2 and this conductor. A rectifying circuit which includes a pair of diodes 27 and 29 interconnects lines L1 and L2 with field coil 11 and SCR's 23 and 25. The conductivity of SCR's 23 and 25, which is controlled by the potential applied to their respective gate electrodes or elements, controls the average level of current flow through field coil 11 which in turn determines the degree of energization of this coil. As explained hereinafter, these SCR's are pulsed between periods of conduction and cutoff to control the average level of current through coil 11.

The portion of the FIG. 1 circuit which constitutes a control means is illustrated as including a phase-shift network consisting of a resistor 31 and a capacitor 33 connected in series across a secondary winding 35 of transformer 21. Connected across capacitor 33 is a full-wave bridge-type rectifying network 37. The rectified output of network 37 is applied to an RC filter network which includes resistors 39 and 41 and a capacitor 43. The filtered output of this RC network is regulated by a voltage-regulating Zener diode 45. Connected in parallel with Zener diode 45 is the fixed resistance 47 of a potentiometer which also includes a movable contact 49. A pair of series-connected resistors 51 and 53 are also connected in parallel with Zener diode 45. A switch, indicated at 55, is connected in series with a resistor 57 between movable contact or slider 49 and a summing point 59. As will be explained, this switch has a closed position or condition wherein the field coil 11 is energized by lines L1 and L2, and an open position wherein this field coil is deenergized. Switch 55 may constitute the contacts of a relay; it may be a manually operated switch; or it may be an electronic switch, for example, a transistor having "on" and "off" states or conditions. A transistor 61 having collector, emitter and base elements is provided. The collector of this transistor is connected to conductor 17; the base, to summing point 59; and the emitter of transistor 61 is connected to a terminal 63. A resistor 67 is connected between terminal 63 and resistor 51. The conductivity of transistor 61, or stated somewhat differently, the impedance in its emitter-collector circuit, controls the D.C. potential of terminal 63 with respect to conductor 17. A coupling resistor 69 is connected between terminal 63 and the gate electrode of SCR 23, while a similar coupling resistor 71 is connected between this terminal and the gate electrode of SCR 25.

Also included in the control circuit portion of the FIG. 1 circuit is an A.C. rider wave source which comprises a pair of phase-shift networks consisting respectively of a resistor 73 connected in series with a capacitor 75, and a resistor 77 connected in series with capacitor 79. Each of these phase-shift networks is connected across the output terminals of a secondary winding 81 of transformer 21. A coupling resistor 83 is connected between the junction between capacitor 79 and resistor 77 and the gate or control electrode of SCR 23, while a similar coupling resistor 85 is connected between the junction between resistor 73 and capacitor 75 and the gate or control electrode of SCR 25. The signal applied to the gate of SCR 23 is thus a composite signal; it has a variable D.C. component (the magnitude of which is proportional to the D.C. potential at point 63) and an A.C. or rider wave component combined therewith by resistor 83. The signal applied to the gate electrode of SCR 25 by the control portion of the FIG. 1 circuit is also a composite signal having a D.C. component (the magnitude of which is also proportional to the variable D.C. potential at point 63) and an A.C. component combined therewith by resistor 85. These composite signals pulse these SCR's between periods of conduction and cutoff with the relative ratio of these periods, i.e., the average level of conductivity of the SCR's, being controlled by the magnitude of the D.C. component of these signals. Because of the reverse connections of phase-shift network 73–75 and network 77–79 across winding 81, the A.C. rider wave of the composite signal applied to the gate of SCR 23 is 180° out-of-phase with that of the composite signal applied to the gate of SCR 25 and accordingly SCR's 23 and 25 are alternately pulsed between conduction and cutoff.

The FIG. 1 circuit further includes an RC series circuit consisting of a resistor 87 and a capacitor 89 connected in parallel with resistor 13. The junction between resistor 87 and capacitor 89 is connected by a coupling resistor 91 and a conductor 93 to summing point 59. Capacitor 89 and resistors 13 and 87 constitute a sensing means which develops a signal having a magnitude which is a time-delayed function of the average level of current flow through coil 11. This developed signal is fed back by resistor 91 and conductor 93 to control, to some extent at least, the conductivity of transistor 61 and thereby control the D.C. potential at point 63.

Operation of the FIG. 1 circuit is as follows: The position of switch 55 determines whether field coil 11 is energized or deenergized. When this switch is open, the regulated D.C. voltage appearing across resistance 47, indicated as $E_Z$, causes transistor 61 to conduct in its fully on or saturation region. This lowers the D.C. potential of point 63 with respect to conductor 17 and as a result the A.C. rider waves which are combined with this D.C. potential and applied to the gate electrodes of SCR's 23 and 25 do not reach a level sufficient to trigger these SCR's into conduction. Under these conditions the relative ratio of periods of conduction of the SCR's to periods of cutoff is zero and no current can flow through field coil 11.

To energize the field coil and thereby bring about a braking or clutching action, switch 55 is actuated to its closed position. This causes a reference or biasing voltage $E_X$ to appear across biasing resistor 65, the magnitude of which is determined by the setting or position of movable arm 49 and also by the resistance of this variable resistance 65. This biasing voltage causes the base of transistor 61 to be positive with respect to its collector, and thus tends to drive the transistor into cutoff. This in turn raises the level of the D.C. component of the composite signals (appearing at point 63) sufficiently so that the 180° out-of-phase A.C. rider wave components of these composite signals alternately trigger the SCR's between periods of conduction and periods of cutoff. The phase relationships between these A.C. rider waves and the A.C. signal appearing on lines L1 and L2 are such that when line L1 is positive with respect to the line L2, SCR 23 is triggered into conduction; and when line L2 is positive with respect to line L1, SCR 25 is triggered into conduction. The durations of periods of conduction of these respective SCR's, i.e., the relative ratio of periods of conduction to periods of cutoff, determine the average level of current through the field coil during a cycle of the sixty-cycle power source. Immediately after actuation of switch 55 to its closed position, SCR 23 conducts during the entire period that line L1 is positive with respect to line L2, and SCR 25 conducts during the entire period that line L2 is positive with respect to line L1. The result is that during the initial energization of coil 11 the average level of current through field coil 11 is substantially the same as if 115 v. A.C. were rectified and applied across the series circuit consisting of coil 11 and resistor 13. During the portion of the cycle of the sixty-cycle power source when line L1 is positive with respect to line L2 current flows from line L1, through SCR 23, through resistor 13, field coil 11, and diode 29 to line L2. Similarly, during the remaining portion of the cycle of the sixty-cycle power source when line L2 is positive with respect to line L1, current flows from line L1, through SCR 25, resistor 13, field coil 11, and diode 27 to line L1. Immediately after actuation of switch 55 to its closed position, then, the current through field coil 11 is a rectified A.C. current which greatly exceeds the rated capacity of the field coil. This causes a rapid build-up of the magnetic field produced by this coil and in turn reduces the time required for a braking or clutching action.

The current through resistor 13 causes a voltage drop across this resistor which is applied across an RC circuit consisting of resistor 87 and capacitor 89. The charge build-up on this capacitor is illustrated in FIG. 2. The voltage appearing across this capacitor, $E_P$, is proportional to this charge buildup and thus has a magnitude which is a time-delayed function of the level of the current flow through resistor 13 and field coil 11. This voltage is fed back by resistor 91 and conductor 93 to summing or input point 59 in opposition to the voltage $E_X$ across resistance 65. As the voltage across capacitor 89 builds up, the resulting negative potential applied at point 59 overcomes the biasing voltage $E_X$ and causes transistor 61 to conduct. This in turn causes the D.C. component of the composite signals applied to the gate electrodes of the SCR's, i.e., the D.C. potential appearing at point 63, to decrease and thereby bring about a reduction in the durations of the periods of conduction of SCR 23 and SCR 25 with respect to a period of the sixty-cycle power source. As a result, the relative ratio of periods of conduction and periods of cutoff of these SCR's is decreased and the average current through field coil 11 accordingly reduced to a level wherein the magnetic field produced by this coil is sufficient to hold the driven and driving members in full engagement.

FIG. 3 is a graph which illustrates the average level of current through the field coil as a function of time. The rated current of this coil, i.e., the current at rated voltage, is indicated by the broken line. The magnitude of this rated current is determined by the setting of movable arm 49 which accurately controls the magnitude of the reference voltage $E_X$. Immediately after the closing of switch 55 at $T_0$, the D.C. potential at point 63 is a maximum and the conductivity of the silicon controlled rectifiers 23 and 25, i.e., the relative ratio of periods of conduction thereof to periods of cutoff, is at a high level. The current through coil 11 accordingly builds up rapidly and almost instantaneously exceeds the rated capacity of this coil. Concurrently, the voltage $E_P$ across capacitor 89 builds up as the charge on this capacitor increases. (See FIG. 2). This voltage, which is of opposite polarity with respect to the voltage $E_X$, is fed back to point 59 to increase the conductivity of transistor 61 and thereby reduce the potential of point 63 with respect to conductor 17. As this potential decreases, the level of conductivity of each of the SCR's is reduced to a level which causes the current through the fiiel dcoil to be equal to the rated capacity of this coil. This happens at time $T_1$. The current through the coil remains at the rated capacity thereof until switch 55 is subsequently opened. Thereafter, the closing of switch 55 again causes the current through the coil to exceed the rated capacity of the coil during a predetermined time interval (from $T_0$ to $T_1$). If capacitor 89, which constitutes a delay means, were not in the sensing portion of the FIG. 1 circuit, the current through the coil would rise to rated current and remain there. Capacitor 89 delays the arrival of the feedback voltage $E_P$ which appears across resistor 13 at summing point 59, and thus permits the current to rise above the rated current and then return to rated current after a period determined by the RC time constant of RC circuit 87, 89.

In one application in which a coupling device such as illustrated in the above-mentioned Jaeschke patent was employed as a brake in a loom to stop a rotating shaft, stopping time (i.e., the time between the actuation of switch 55 and the stopping of the shaft) was approximately 47 milliseconds when the field coil of this device was energized by a conventional 12 v. D.C. source. This same coupling device stopped this same rotating shaft in less than 30 milliseconds when energized by a control such as illustrated in FIG. 1. This represents a reduction of more than 33% in the overall response time. When energized by the control of FIG. 1, the time required for the current through the coil to rise from zero to rated was 3.75 milliseconds; the time for the current to rise from rated to 300% rated was 17.5 milliseconds; and the time required for the current to return from 300% rated to rated was 26.2 milliseconds. If contacts 55, which in the above applications were the contacts of a solenoid type relay, were replaced by an electronic switch, for example a transistor or vacuum tube, it is estimated that the overall response time would be reduced even more, approximately 7 milliseconds, to result in an overall response time of less than 25 milliseconds.

While the electronic transducers employed to control the level of the current through the field coil are illustrated in FIG. 1 as being silicon controlled rectifiers, it will be understood that other electronic devices, such as vacuum tubes, gas tubes or transistors could be employed to perform this control function. Also, while a transistor 61 is illustrated as comprising the electronic transducer in the control portion of the FIG. 1 circuit, other electronic devices having similar characteristics might be employed as this transducer. Moreover, in some applications the rated capacity of the field coil may be such that the current through this coil, while following generally a curve such as illustrated in FIG. 3, will not exceed this rated capacity during the initial energization period between $T_0$ and $T_1$.

In view of the above, it will be seen that the several objects of the invention are achieved and other advantageous results attained.

As various changes could be made in the above constructions and circuits without departing from the scope of the invention, it is intended that all matter contained in the above description and shown in the accompanying drawing be interpreted as illustrative and not in a limiting sense.

What is claimed is:

1. A control for energizing a field coil associated with electromagnetic coupling apparatus comprising:
   a source of electrical power,
   an electronic transducer having a control electrode adapted to control the conductivity of said transducer,
   a first electrical circuit interconnecting said power source with said transducer and said field coil, the average level of conductivity of said transducer establishing the degree of energization of said field coil,
   control means having an input and adapted to supply an output signal to said control electrode to change the conductivity of said transducer from a first state of high conductivity to a second state wherein the average conductivity of said transducer is reduced to a predetermined level,
   means for sensing the current flow through said field coil and developing an electrical signal having a magnitude which is a time-delayed function of the level of said current flow,
   and a second electrical circuit interconnecting said sensing and delay means with said input whereby the conductivity of said transducer is changed from said first to said second state at a delayed interval after initial energization of said field coil and the initial degree of energization of the field coil is thereupon accordingly reduced.

2. A control as set forth in claim 1 wherein said control means includes means for supplying a variable D.C. potential, means for supplying an A.C. rider wave, and means for combining said D.C. potential and said rider wave to produce said output signal.

3. A control as set forth in claim 2 wherein said electronic transducer is a semiconductor device having a gate electrode, and wherein said output signal is applied to said gate electrode to repetitively pulse said semiconductor device between periods of conduction and cutoff, the relative ratio of said periods being a function of the magnitude of said variable D.C. potential whereby the average level of conduction of said semiconductor device is a function of the magnitude of said variable D.C. potential.

4. A control as set forth in claim 2 wherein said means for supplying said variable D.C. potential includes a second electronic transducer having a control electrode, said sensing means includes a capacitor interconnected with said field coil whereby the potential appearing across said capacitor is a time-delayed function of the current through said field coil, and said second electrical circuit interconnects one terminal of said capacitor to the control electrode of said second transducer whereby the potential appearing across said capacitor determines the conductivity of said second transducer and thereby controls the magnitude of said variable D.C. potential.

5. A control as set forth in claim 4 wherein said control means further includes a source of D.C. reference voltage and means for applying said reference voltage to the control electrode of said second electronic transducer to bias said second transducer and thereby determine the magnitude of said variable D.C. potential after said delayed interval after initial energization of said field coil whereby said reference voltage establishes a predetermined energization level of said field coil after said interval.

6. A control as set forth in claim 1 wherein said control means includes switch means which in a first condition causes said field coil to be energized by said source of electrical power, and which in a second condition causes said field coil to be deenergized, and wherein initial energization of said field coil occurs when said switch means is actuated from its second to its first condition.

7. A control as set forth in claim 1 wherein said source of electrical power is an A.C. source, and wherein said first electrical circuit is a rectifying circuit interconnecting said power source with said transducer and said field coil whereby current flows through said field coil in only one direction.

8. A control for energizing a field coil associated with electromagnetic friction-type coupling apparatus comprising:
   an A.C. power source,
   a pair of electronic transducers each having a control electrode adapted respectively to control the conductivity of said transducers,
   a first electrical circuit interconnecting said A.C. power source with said transducers and said said field coil, the average level of conductivity of said transducers establishing the degree of energization of said field coil,
   control means having an input and adapted to supply an output signal to each of said control electrodes to repetitively and alternately pulse said transducers between conduction and cutoff, the relative ratio of periods of conduction and cutoff being controlled to change the average conductivity of each of said transducers from a first state of high conductivity to a second state wherein the average conductivity of said transducers is reduced to a predetermined level,
   means for sensing the current flow through said field coil and developing an electrical signal having a magnitude which is a time-delayed function of the level of said current flow,
   and a second electrical circuit interconnecting said sensing and delay means with the input of said control means whereby the conductivities of said transducer are changed from said first state to said second state at a delayed interval after initial energization of said field coil and the initial degree of energization of the field coil is thereupon accordingly reduced.

9. A control as set forth in claim 8 wherein each of said electronic transducers is a silicon controlled rectifier having a gate electrode, and wherein the output signal applied to the gate electrode of a first of said silicon controlled rectifiers from said control means is a first composite signal having a variable D.C. component and an A.C. rider wave, and the output signal applied to the gate electrode of the second of said silicon controlled rectifiers is a second composite signal having a variable D.C. component and an A.C. rider wave which is approximately 180° out-of-phase with the A.C. rider wave of said first composite signal whereby said silicon controlled rectifiers are alternately pulsed into periods of conduction.

10. A control as set forth in claim 9 wherein said control means includes means for supplying the variable D.C. component of each of said composite signals, a second A.C. source and a pair of phase-shift networks connected across the output of said second A.C. source for supplying said 180° out-of-phase rider wave components of said composite signals.

11. A control as set forth in claim 10 wherein said means for supplying the variable D.C. component of each of said composite signals includes a transistor having a control electrode, said sensing means includes a resistor connected in series with said field coil and an RC network including a capacitor connected in parallel with said resistor whereby the potential appearing across said capacitor is a time-delayed function of the current through said transistor, and said second electrical circuit connects one terminal of said capacitor to the control element of said transistor whereby the potential appearing across said capacitor determines the conductivity of said transistor and thereby controls the magnitude of said variable D.C. component.

12. A control as set forth in claim 11 wherein said control means further includes a regulated D.C. power supply, a potentiometer having a fixed resistance connected across the output teminals of said power supply and a movable contact connected to the control electrode of said transistor to bias said transistor and thereby determine the magnitude of the D.C. components of said composite signals after said delayed interval after initial energization of said field coil whereby the position of said movable contact determines the degree of energization of said field coil after said interval.

13. A control as set forth in claim 12 wherein said control means further includes switch means connected between said movable contact and the control electrode of said transistor, said switch means having a closed position in which the said field coil is energized and an open position in which said field coil is deenergized, and wherein initial energization of said field coil occurs when said switch means is actuated from its open to its closed position.

14. A control as set forth in claim 8 wherein said first electrical circuit is a rectifier circuit which includes a pair of diodes, one connected in series with each of said pair of electronic transducers.

References Cited by the Examiner
UNITED STATES PATENTS

| | | | |
|---|---|---|---|
| 2,788,104 | 4/1957 | Mason | 192—84 |
| 2,977,523 | 3/1961 | Cockrell | 323—22 |
| 3,026,454 | 3/1962 | Goodwin | 317—148.5 XR |
| 3,084,310 | 4/1963 | Schurr | 317—148.5 XR |
| 3,123,746 | 3/1964 | Wachowiak | 317—148.5 |

SAMUEL BERNSTEIN, *Primary Examiner.*